US008755946B2

(12) United States Patent  (10) Patent No.: US 8,755,946 B2
Xia et al.  (45) Date of Patent: *Jun. 17, 2014

(54) METHOD AND APPARATUS FOR USING PLC-BASED SENSOR UNITS FOR COMMUNICATION AND STREAMING MEDIA DELIVERY, AND FOR MONITORING AND CONTROL OF POWER USAGE OF CONNECTED APPLIANCES

(75) Inventors: Mingyao Xia, Shenzhen (CN); Eric Grubel, Thousand Oaks, CA (US); Dan Castellano, Cupertino, CA (US)

(73) Assignee: Asoka USA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/032,454

(22) Filed: Feb. 22, 2011

(65) Prior Publication Data

US 2012/0065799 A1 Mar. 15, 2012

(51) Int. Cl.
*G06F 1/28* (2006.01)
*G05B 11/01* (2006.01)

(52) U.S. Cl.
USPC .......................... 700/295; 700/19; 340/12.32

(58) Field of Classification Search
USPC ........ 700/9, 19, 22, 286, 291, 295; 340/12.32
See application file for complete search history.

(56) References Cited

U.S. PATENT DOCUMENTS

| | | | |
|---|---|---|---|
| 5,090,024 A | 2/1992 | Vander Mey et al. | |
| 5,553,072 A | 9/1996 | Daggett et al. | |
| 5,572,438 A | 11/1996 | Ehlers et al. | |
| 5,630,204 A * | 5/1997 | Hylton et al. | 725/116 |
| 5,999,612 A | 12/1999 | Dunn et al. | |
| 6,252,883 B1 | 6/2001 | Schweickart et al. | |
| 6,378,131 B2 | 4/2002 | Cunningham et al. | |
| 6,553,418 B1 * | 4/2003 | Collins et al. | 709/224 |
| 6,633,823 B2 * | 10/2003 | Bartone et al. | 702/57 |
| 6,826,607 B1 | 11/2004 | Gelvin et al. | |
| 6,854,059 B2 | 2/2005 | Gardner | |
| 6,882,709 B1 | 4/2005 | Sherlock et al. | |
| 6,956,464 B2 | 10/2005 | Wang et al. | |
| 6,961,641 B1 * | 11/2005 | Forth et al. | 700/295 |
| 6,988,025 B2 * | 1/2006 | Ransom et al. | 700/295 |
| 6,990,395 B2 * | 1/2006 | Ransom et al. | 700/295 |

(Continued)

OTHER PUBLICATIONS

Heile, , "Smart Grids for Green Communcations", IEEE Wireless Communications, Jun. 2010, pp. 4-6 (online). Retrieved on Jul. 4, 2012, internet URL:,http://dl.comsoc.org/livepubs/pci/public/2010/jun/pdf/wciindpersp.pdf>, entire document, 4-6.

*Primary Examiner* — Charles Kasenge
(74) *Attorney, Agent, or Firm* — Michael A. Glenn; Perkins Coie LLP

(57) ABSTRACT

A group of sensors use power line communication (PLC) technology to collect power usage information and enable power management and control, as well as provide local area networking. The sensors include an intelligent master sensor and one or more slave devices, such as a communication and power management sensor and a power control switch sensor. The master collects and compiles power usage data from the slaves and communicates this data via the web or other communication means to the outside world. The master also receives and distributes instructions for controlling power usage via associated switches in the home or office. These sensors provide integrated sensing and control of home power usage and power management and establish a LAN that has communication capability and that supports streaming media delivery.

6 Claims, 8 Drawing Sheets

(56) References Cited

U.S. PATENT DOCUMENTS

| | | | |
|---|---|---|---|
| 6,993,417 B2* | 1/2006 | Osann, Jr. | 700/291 |
| 7,020,701 B1 | 3/2006 | Gelvin et al. | |
| 7,113,763 B2 | 9/2006 | Heinonen et al. | |
| 7,136,936 B2 | 11/2006 | Chan et al. | |
| 7,142,094 B1 | 11/2006 | Davidow et al. | |
| 7,173,938 B1 | 2/2007 | Davidow | |
| 7,194,528 B1 | 3/2007 | Davidow | |
| 7,231,280 B2* | 6/2007 | Costa | 700/286 |
| 7,231,281 B2* | 6/2007 | Costa | 700/286 |
| 7,245,472 B2 | 7/2007 | Davidow | |
| 7,319,717 B2 | 1/2008 | Zitting | |
| 7,345,998 B2 | 3/2008 | Cregg et al. | |
| 7,363,398 B2 | 4/2008 | Scott | |
| 7,415,541 B2 | 8/2008 | Chan et al. | |
| 7,423,546 B1* | 9/2008 | Aisa | 340/679 |
| 7,444,401 B1* | 10/2008 | Keyghobad et al. | 709/224 |
| 7,461,174 B2 | 12/2008 | Chan et al. | |
| 7,463,986 B2 | 12/2008 | Hayes | |
| 7,688,841 B2 | 3/2010 | Binder | |
| 7,690,949 B2 | 4/2010 | Binder | |
| 7,701,331 B2 | 4/2010 | Tran | |
| 7,734,380 B2* | 6/2010 | Ransom et al. | 700/286 |
| 7,734,572 B2* | 6/2010 | Wiemeyer et al. | 700/19 |
| 7,738,999 B2 | 6/2010 | Petite | |
| 7,751,795 B2 | 7/2010 | McCarty et al. | |
| 7,752,309 B2 | 7/2010 | Keyghobad et al. | |
| 7,769,907 B2 | 8/2010 | Chan et al. | |
| 7,769,908 B2 | 8/2010 | Chan et al. | |
| 7,773,361 B2 | 8/2010 | Davidow | |
| 7,778,152 B2 | 8/2010 | Chan | |
| 7,825,793 B1 | 11/2010 | Spillman et al. | |
| 7,826,395 B2 | 11/2010 | Kim | |
| 8,213,895 B2* | 7/2012 | Hurwitz et al. | 455/402 |
| 8,306,634 B2* | 11/2012 | Nguyen et al. | 700/14 |
| 8,503,150 B2* | 8/2013 | Chang | 361/117 |
| 2002/0023267 A1 | 2/2002 | Hoang | |
| 2002/0026646 A1 | 2/2002 | Hoang | |
| 2002/0114336 A1 | 8/2002 | Chow | |
| 2002/0165943 A1 | 11/2002 | Hoang | |
| 2002/0170059 A1 | 11/2002 | Hoang | |
| 2003/0050737 A1* | 3/2003 | Osann, Jr. | 700/276 |
| 2004/0138786 A1* | 7/2004 | Blackett et al. | 700/295 |
| 2004/0139472 A1 | 7/2004 | Furet et al. | |
| 2004/0155985 A1 | 8/2004 | Dethier et al. | |
| 2004/0193329 A1* | 9/2004 | Ransom et al. | 700/286 |
| 2004/0212481 A1* | 10/2004 | Abraham | 340/310.01 |
| 2005/0008345 A1 | 1/2005 | Choi et al. | |
| 2005/0157215 A1 | 7/2005 | Minnick et al. | |
| 2005/0160467 A1 | 7/2005 | Moons et al. | |
| 2005/0184867 A1* | 8/2005 | Osann, Jr. | 340/539.25 |
| 2005/0207079 A1* | 9/2005 | Tiller et al. | 361/64 |
| 2005/0272402 A1* | 12/2005 | Ferentz et al. | 455/402 |
| 2006/0049694 A1 | 3/2006 | Kates | |
| 2006/0088149 A1 | 4/2006 | Sung | |
| 2006/0168624 A1 | 7/2006 | Carney et al. | |
| 2006/0227884 A1 | 10/2006 | Koga et al. | |
| 2007/0043477 A1 | 2/2007 | Ehlers | |
| 2007/0132579 A1 | 6/2007 | Kim | |
| 2007/0183543 A1 | 8/2007 | Lu | |
| 2007/0204286 A1 | 8/2007 | Candelore | |
| 2007/0213879 A1* | 9/2007 | Iwamura | 700/292 |
| 2007/0229231 A1* | 10/2007 | Hurwitz et al. | 340/310.11 |
| 2007/0233323 A1* | 10/2007 | Wiemeyer et al. | 700/276 |
| 2007/0250900 A1 | 10/2007 | Marcuvitz | |
| 2008/0015740 A1* | 1/2008 | Osann, Jr. | 700/276 |
| 2008/0024605 A1* | 1/2008 | Osann, Jr. | 348/143 |
| 2008/0106146 A1* | 5/2008 | Baek et al. | 307/35 |
| 2008/0130640 A1* | 6/2008 | Hurwitz et al. | 370/389 |
| 2008/0137572 A1 | 6/2008 | Park et al. | |
| 2008/0221737 A1 | 9/2008 | Josephson et al. | |
| 2008/0317070 A1 | 12/2008 | Propp et al. | |
| 2009/0040057 A1 | 2/2009 | Keyghobad et al. | |
| 2009/0117915 A1 | 5/2009 | Lee et al. | |
| 2009/0187499 A1* | 7/2009 | Mulder et al. | 705/30 |
| 2009/0195349 A1 | 8/2009 | Frader-Thompson et al. | |
| 2009/0287838 A1* | 11/2009 | Keyghobad et al. | 709/230 |
| 2009/0287966 A1* | 11/2009 | Keyghobad et al. | 714/48 |
| 2009/0319853 A1* | 12/2009 | Keyghobad et al. | 714/749 |
| 2010/0027599 A1 | 2/2010 | Di Chiro et al. | |
| 2010/0070217 A1 | 3/2010 | Shimada et al. | |
| 2010/0076701 A1 | 3/2010 | Harish | |
| 2010/0094475 A1 | 4/2010 | Masters et al. | |
| 2010/0097528 A1 | 4/2010 | Seo | |
| 2010/0102987 A1 | 4/2010 | Lou et al. | |
| 2010/0121968 A1 | 5/2010 | Clark | |
| 2010/0156666 A1* | 6/2010 | Choi et al. | 340/870.07 |
| 2010/0169940 A1 | 7/2010 | Howarter et al. | |
| 2010/0182160 A1 | 7/2010 | Lu | |
| 2010/0204850 A1 | 8/2010 | Henderieckx | |
| 2010/0207728 A1* | 8/2010 | Roscoe et al. | 340/10.1 |
| 2010/0217449 A1 | 8/2010 | Musti et al. | |
| 2010/0228601 A1 | 9/2010 | Vaswani et al. | |
| 2010/0233975 A1 | 9/2010 | Wu et al. | |
| 2010/0241245 A1* | 9/2010 | Wiemeyer et al. | 700/19 |
| 2010/0250497 A1 | 9/2010 | Redlich et al. | |
| 2010/0292858 A1* | 11/2010 | Iwamura | 700/293 |
| 2010/0327766 A1 | 12/2010 | Recker et al. | |
| 2011/0035491 A1 | 2/2011 | Gelvin et al. | |
| 2011/0037589 A1 | 2/2011 | Liu et al. | |
| 2011/0040785 A1* | 2/2011 | Steenberg et al. | 707/769 |
| 2011/0054700 A1 | 3/2011 | Chan et al. | |
| 2011/0054710 A1 | 3/2011 | Imes et al. | |
| 2011/0066300 A1 | 3/2011 | Tyagi et al. | |
| 2011/0077758 A1 | 3/2011 | Tran et al. | |
| 2011/0082599 A1* | 4/2011 | Shinde et al. | 700/295 |
| 2011/0087522 A1 | 4/2011 | Beaty et al. | |
| 2011/0121654 A1 | 5/2011 | Recker et al. | |
| 2011/0161251 A1 | 6/2011 | Carey et al. | |
| 2011/0184581 A1 | 7/2011 | Storch et al. | |
| 2011/0196547 A1* | 8/2011 | Park et al. | 700/296 |
| 2011/0202190 A1 | 8/2011 | Venkatakrishnan et al. | |
| 2011/0202198 A1* | 8/2011 | Venkatakrishnan et al. | 700/296 |
| 2011/0202910 A1* | 8/2011 | Venkatakrishnan et al. | 717/171 |
| 2011/0215736 A1 | 9/2011 | Horbst et al. | |
| 2011/0231320 A1 | 9/2011 | Irving | |
| 2011/0238235 A1* | 9/2011 | Xia et al. | 700/297 |
| 2011/0264291 A1 | 10/2011 | Le Roux et al. | |
| 2011/0271317 A1* | 11/2011 | Xia et al. | 725/111 |
| 2011/0307109 A1 | 12/2011 | Sri-Jayantha | |
| 2012/0001548 A1 | 1/2012 | Recker et al. | |
| 2012/0053737 A1* | 3/2012 | Valluri et al. | 700/276 |
| 2012/0066023 A1* | 3/2012 | Xia et al. | 705/7.29 |

\* cited by examiner

METHOD AND APPARATUS FOR USING PLC-BASED SENSOR UNITS FOR COMMUNICATION AND STREAMING MEDIA DELIVERY, AND FOR MONITORING AND CONTROL OF POWER USAGE OF CONNECTED APPLIANCES

BACKGROUND OF THE INVENTION

1. Technical Field

The invention relates to power line networking, with remote power monitoring and control of appliances, within a local area network. More particularly, the invention relates to reducing the carbon foot print of in-home appliances by using appropriate devices for power monitoring, data collection, and control and communication over power lines.

2. Description of the Background Art

The communication of information over power lines has been known from the early $20^{th}$ century but, due to the higher cost and other limitations for extending the connectivity, the use of such power line communication (PLC) systems has been limited to local area networks within homes, apartments, or offices. Basic devices for connecting to the power line for communication and power supply have been designed and used to provide service within local area networks (LANs). But, due to more efficient competing technologies, the infrastructure for power line communication never developed to make it a mainstream technology. A number of patents and patent applications dating from the early 1900s exist that cover communication via power lines. Despite this early start, power line communication technology has not become a main stream communication technology and the adaptation of this technology has been slow. This can be attributed to various reasons, including the higher cost of available devices and the lack of suitable devices for communication using power line technology. Thus, there are no power line devices currently available that can compete efficiently for standard voice and data communication against such technologies as xDSL, cell phones, and satellite communications.

It be advantageous to provide an application with which power line communication technology can be optimally used, and to develop devices that cater to such application for the future growth and development of the power line communication technology to bring forth its potential.

SUMMARY OF THE INVENTION

A method and apparatus are described in which a group of sensors use power line communication (PLC) technology to collect power usage information and enable power management and control, as well as local area networking for a home or office environment. The sensors include an intelligent master sensor and one or more slaves, such as a communication and power management sensor and a power control switch sensor. The master collects and compiles power usage data from the slaves and communicates the power usage data to the outside world via the web or other communication means. The master also receives and distributes instructions for controlling power usage via associated switches in the home or office. These sensors provide integrated sensing and control of home power usage and power management, and establish a LAN that has communication capability and that supports streaming media delivery.

DETAILED DESCRIPTION OF THE INVENTION

Figure 1:
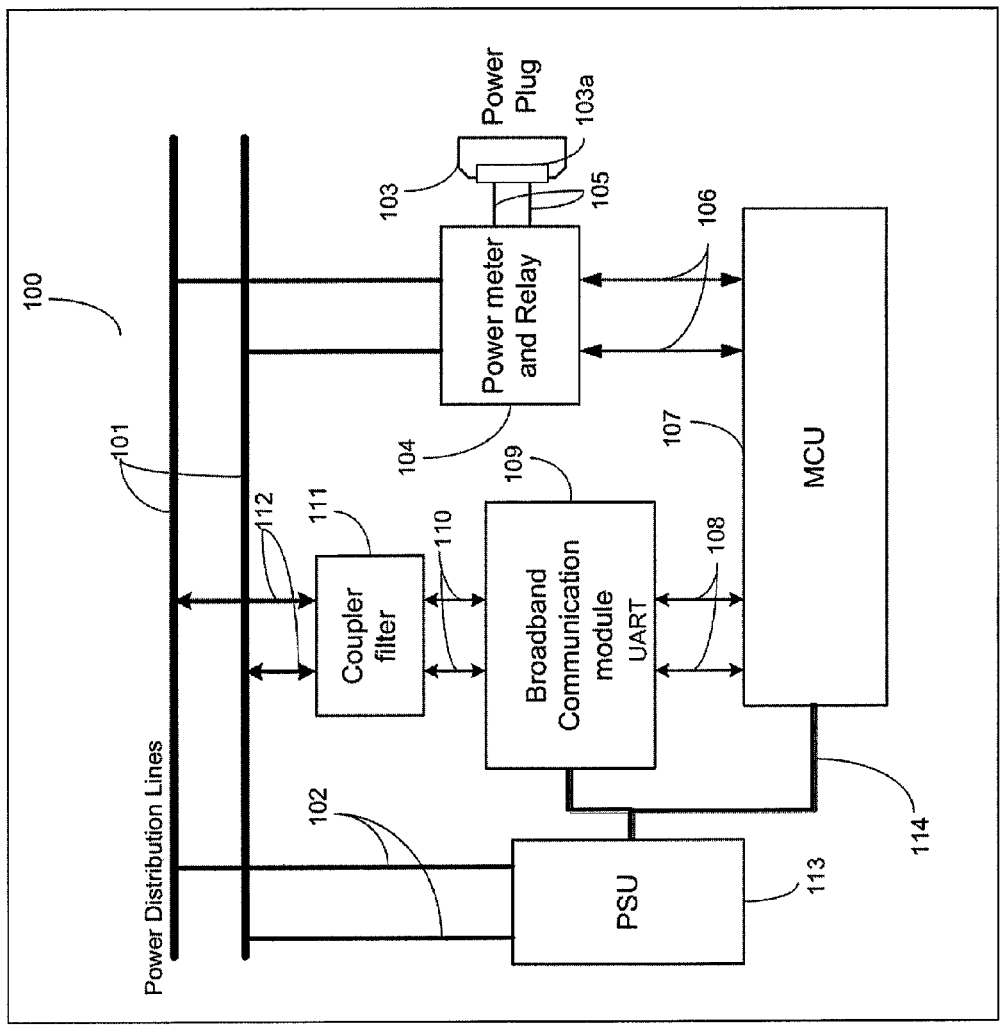
FIG. 1 is a block schematic diagram showing a power switch unit (SW) having a broadband information transfer capability according to the invention.

The recent worldwide introduction of new Green technologies and the requirement for end user monitoring and control of a 'carbon footprint' of homes and offices has created a need to assess the in-building power usage pattern and magnitude of the usage remotely, and provide the ability to supervise and control the power usage remotely. It is necessary to be able to monitor and control the power usage at a detailed level for the consumer, who is then able to exercise the necessary constraints on use if the proper tools are provided to him. It is also necessary to monitor the usage pattern and collect data on a macro level to develop policies that are beneficial to the overall reduction in 'carbon footprint' at the home and office level, as well as on a national level. Empowering the individual and society to exercise the necessary controls by monitoring the power usage is an area where power line communication and control can be effectively and optimally used.

To this end, a method and apparatus are described in which a group of sensors use power line communication (PLC) technology to collect power usage information and enable power management and control, as well as local area networking for a home or office environment. The sensors include an intelligent master sensor and one or more slaves, such as a communication and power management sensor and a power control switch sensor. The master collects and compiles power usage data from the slaves and communicates the power usage data to the outside world via the web or other communication means. The master also receives and distributes instructions for controlling power usage via associated switches in the home or office. These sensors provide integrated sensing and control of home power usage and power management, and establish a LAN that has communication capability and that supports streaming media delivery.

The invention build upon existing communication capability provided by such power line communication (PLC) devices as described by Chan, et al. (U.S. Pat. No. 7,769,908 filed on Mar. 25, 2008, hence forth 'Chan'), which patent is assigned to a common assignee, and which patent is incorporated herein in its entirety by this reference thereto. The 'Chan' PLC devices are enabled to provide capability for communication over power lines.

The invention provides for collection of power usage information and provides for remote control of power usage of appliances and other devices connected to the disclosed sensor devices or units. This above capability is established in addition to the PLC LAN capability made available by use of such communication enabled power monitoring and control devices. Three types of units that enable the monitoring and control of power usage and the collection of power data for the local area networked home or office and their application within the home or office are disclosed. The three units are mainly required for cost reduction by providing appropriate capabilities, as will become clear when the application of the devices are described. The three units that allow these unique features within the home or office include:

1. A power switch sensor unit (SW);
2. A data communication enabled power switch sensor unit, typically using Ethernet (ETH); and
3. A master unit (MST).

Power Switch Sensor (SW)

The SW is one of the basic units of the invention. This allows an appliance in the home or office to be connected to the power outlet through the device. The device provides for the monitoring of power consumption of the appliance with capability for remote power control (typically on/off) of the connected appliance through the Internet.

FIG. 1 is a schematic block diagram of a first implementation of a SW unit 100. The main power distribution lines 101 carry power around the home. The power is connected through a power meter and relay module 104, and through the power lines 105 to a power plug 103. Typically the power plug comprises an additional noise filter 103a to remove any noise transmission to the connected appliance and from the appliance to the power meter and relay module. The power meter and relay module 104 optionally includes a power control module. The power supply to the power plug 103 can be enabled or disabled using the relay in the power meter and relay module 104. If the power meter and relay module 104 includes the optional power control module, then the optional power control module controls the amount of power delivered through the plug 103, for example for soft motor start, etc. using the power control function of the power meter and relay module 104.

The power meter in the power meter and relay module 104 continuously monitors the power usage at the plug 103. A communication link 106 connects the power meter and relay module 104 to a microcontroller (MCU) 107 that collects the information regarding power usage from the power meter and relay module 104 for transmission using a communication module 109. The communication module includes a universal asynchronous receiver and transmitter (UART) that is connected to the MCU 107 via communication links 108. The data is converted by the communication module 109 to a broadband format for transmission over the power distribution lines 101. This information is then sent over broadband communication links 110 to a power line coupler filter module 111 which is connected to the power distribution lines 101 via broadband communication links 112. The coupler filter module 111 in an embodiment comprises a high pass filter that allows bidirectional passage for the broadband PLC frequency band, while attenuating the lower frequencies. The broadband format for communication used for transfer of the collected information on power usage is the same as that used for PLC data transfer.

Because the communication connections and modules are bidirectional, commands received over the power lines 101 are used by the MCU 107 to provide control of the power meter and relay module 104 to enable or disable the plug 103 and control the power flow through the plug 103. In this instance, the commands are also communicated back to SW100 using the same broadband communication format typically used for PLC for transfer of power usage information collected. In the case where commands are sent over the PLC for the SW 100, the commands are received by the communication module 109 through the power line coupler filter module 111, which module is connected to the power distribution lines 101. These commands are extracted by the communication module 109 and sent to the MCU 107 via the communication links 108. The MCU 107 then sends the necessary instructions to the power meter and relay module 104 to enable, disable, or control the flow of power to the plug 103, based on the commands received.

Power for the modules in the SW is supplied by an inbuilt power supply module (PSU) 113 that is connected to the power distribution lines 101 through power lines 102. The PSU supplies the power to the modules via power lines 114.

Figure 2:
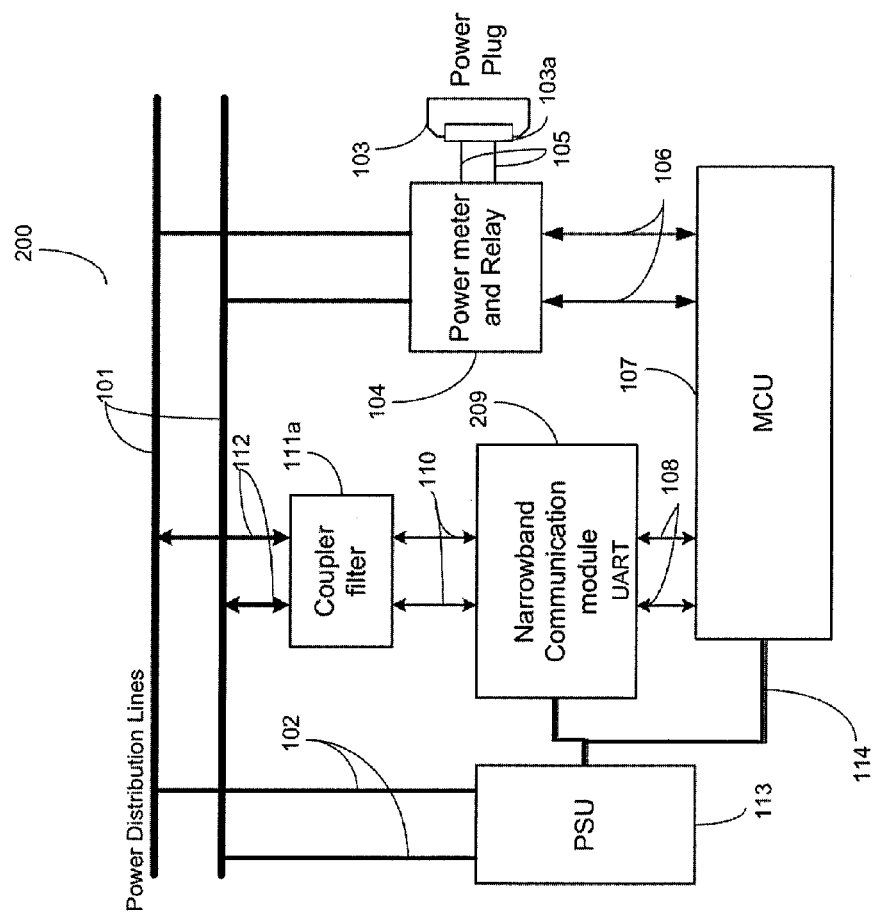
FIG. 2 is a block schematic diagram showing a power switch unit (SW) having a narrowband information transfer capability according to the invention.

FIG. 2 is a schematic block diagram of a second implementation of the SW unit 200. In this implementation, information on power usage that is collected by the MCU 107 and sent to the communication module 209 is converted for transmission over the power lines 101 as a narrowband transmission format instead of as broadband transmission used for PLC. Similarly, control commands are received over the power line for SW 200 in the narrowband transmission format.

Similar to SW 100, in the SW 200 implementation the main power distribution lines 101 are used to carry power around the home. The power is connected through a power meter and relay module 104, and through the power lines 105 to the power plug 103. The power meter and relay module 104 optionally includes a power control module. The power can be enabled or disabled using the relay in the power meter and relay module 104. If the power meter and relay module 104 has the optional power control module, the module controls the amount of power delivered through the plug 103, for example for soft motor start, etc. using the power control in the power meter and relay module 104.

The power meter in the power meter and relay module 104 continuously monitors the power usage at the plug 103. A communication link 106 connects the power meter and relay module 104 to the MCU 107. The MCU collects the information regarding power usage from the power meter and relay module 104. The collected information is transmitted to a communication module 209 through a UART that is connected to the MCU 107 via communication links 108. The information is converted by the communication module 209 to a narrowband format for transmission over the power distribution lines 101. This information is then sent over communication links 110 to a power line coupler filter module 111a which is connected to the power distribution lines 101 via communication links 112. In this implementation of SW 200, the narrowband format for communication used for transfer of the collected information on power usage is different from the broadband format that is typically used for PLC data transfer. The coupler filter module 111a is a bidirectional band pass filter that allows the narrowband frequencies to pass through while blocking the higher broadband frequencies and the lower power supply frequencies.

The communication connections and modules are bidirectional. Commands received over the power lines 101 provide control of the power meter and relay module 104 to enable or disable the plug 103 and also control the power flow through the plug 103. In this implementation, the commands are communicated back to SW 200 using the same narrowband communication format used for transfer of power usage information collected. The commands are received by the communication module 209 through the power line coupler filter module 111*a* that is connected to the power distribution lines 101. These commands are extracted by the communication module 209 and sent to the MCU 107 via the communication links 108. The MCU 107 then interprets the commands and sends the necessary instructions to the power meter and relay module 104 to enable, disable, or control the flow of power to the plug 103, based on the commands received.

Data Communication Enabled Power Switch Module (ETH)

The ETH is the second unit of the invention. This unit allows an appliance in the home or office to be connected to the power supply through the ETH, and provides for the monitoring of power consumption with capability for remote control of the connected appliance. The ETH further provides the capability for data and communication devices to be connected to the power distribution line in the home or office through a connector. The connector used is typically an Ethernet connector. This should not be considered as limiting because other types of connectors are also be used for communications, as is well understood by those knowledgeable in the art. Multiple ETH units can be used to establish a PLC based local area net work (LAN) in the home.

Figure 3:
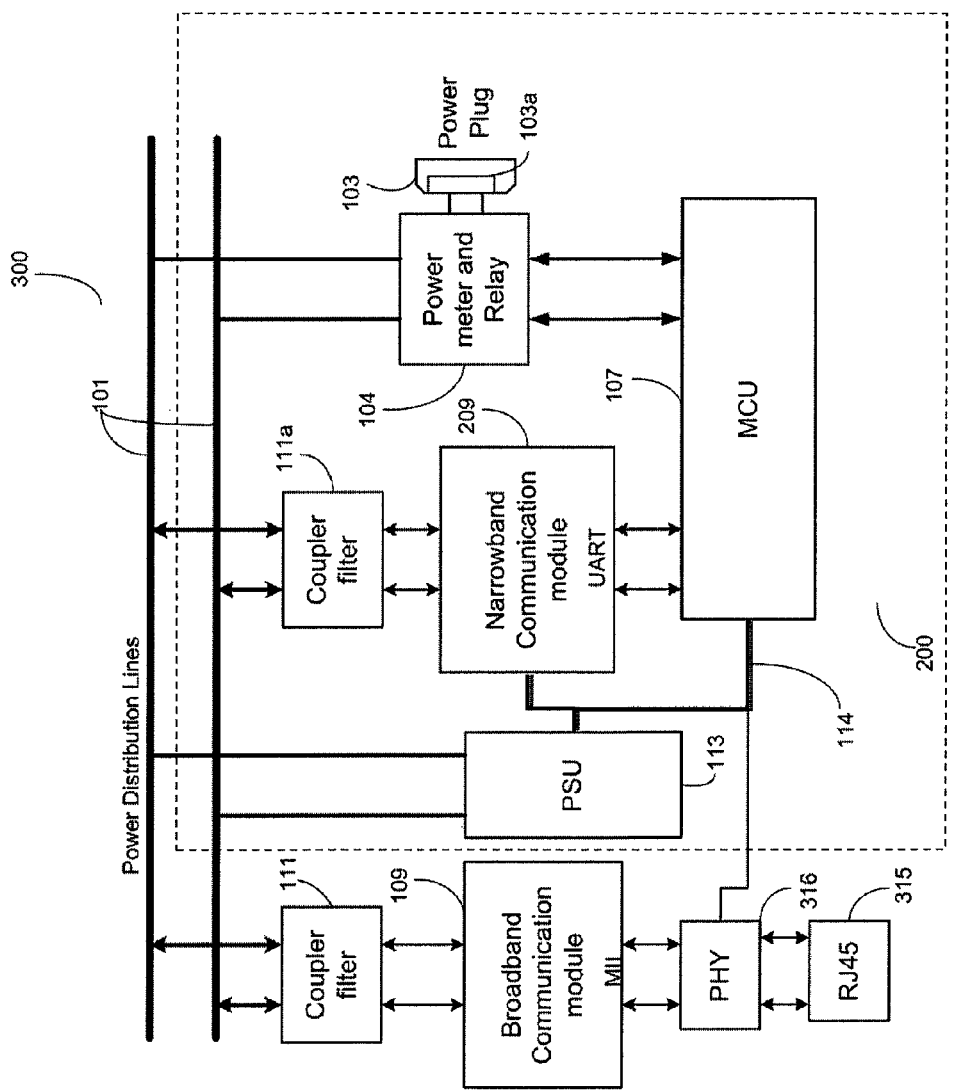
FIG. 3 is a block schematic diagram showing a data communication enabled power switch unit (ETH) having broadband for PLC and narrowband for monitor and control information transfer according to the invention.

FIG. 3 is a schematic block diagram of a first implementation of the ETH unit 300. The ETH 300 is a combination of two subunits: a broadband PLC subunit, and a SW subunit, for example, SW 200. The SW subunit in this instantiation shown in FIG. 3 uses narrowband communication for information transfer on power usage and control. The ETH block schematic contains all of the PLC broadband communication modules with modules of SW 200 that together form the block schematic of an ETH 300. The block schematic of the SW 200 is the same as in FIG. 2 with narrowband information transfer capability. The operation of the SW 200 subunit of the ETH 300 is as described earlier for the SW 200.

The broadband communication subunit of the ETH 300 typically comprises an RJ45 connector 301 for CAT5 Ethernet cable which is used as a broadband communication I/O connector into the ETH 300. The RJ45 connector 315 is connected through a physical layer interface (PHY) module 316 to a media interface input (MII) on a broadband PLC communication module 309. The communication module 309 converts the analog input into the broadband format that is then passed on to the main power distribution lines 101, through a coupler filter module 111. The main power distribution lines 101 form the LAN within a home or office for data communication. The broadband communication elements are bidirectional and allow any broadband communication meant for a consumer connected to the RJ45 connector 315 to be received by the correct consumer. The data in broadband format is received by the communication device 309 through the coupler filter module 111 from the main power line 101. The communication module 309 converts the received data stream into the analog format and sends it through the MII interface of the communication module 309 to the PHY 316, to the RJ45 module 315, and to the connected customer device. The use of broadband communication within the PLC LAN using the ETH 300 units allows the provision of streaming media delivery capability to connected display devices, connected to appropriate communication units within the PLC LAN.

Figure 4:
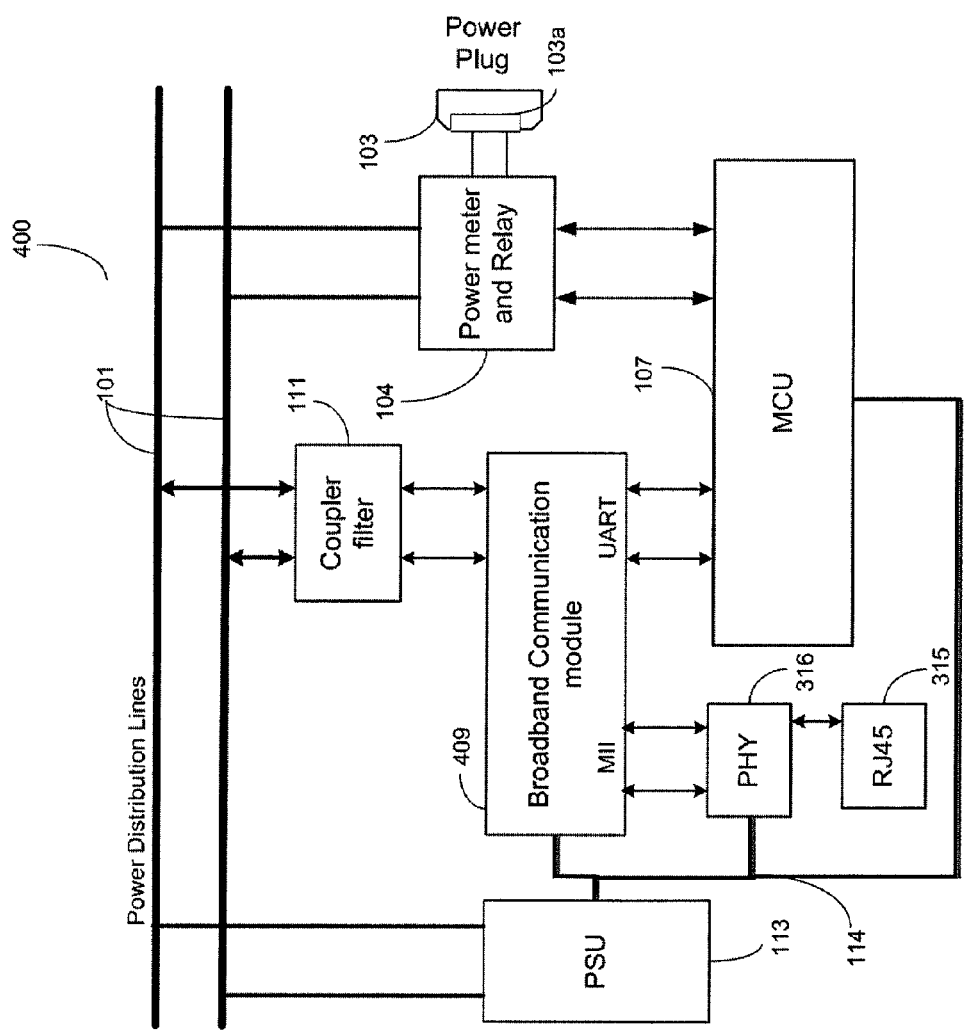
FIG. 4 is a block schematic diagram showing a data communication enabled power switch unit (ETH) having broadband for PLC and for monitor and control information transfer according to the invention.

FIG. 4 is a schematic block diagram of a second implementation of the ETH unit 400. The ETH 400 implementation provides data communication capability and power monitoring and control capability. The ETH 400 uses the broadband communication format used by the PLC data communication for data communication over power lines and for transfer of information regarding power monitoring and control. In FIG. 4, the RJ45 connector 315 is connected through the PHY 316 to an MII port on the communication module 409, which is used to convert the incoming data stream into the broadband format used for PLC. This data stream is then transferred from communication module 409 to the power distribution lines 101 in the home or office through the coupler filter module 111. Using multiple ETH 400 units within a home or office enables PLC LAN connectivity within the home or office. Here, also, the disclosed use of broadband communication within the PLC LAN using the units enables streaming media delivery capability to connected display devices, connected to appropriate communication units within the PLC LAN.

The power supply to the plug 103 is from the power distribution lines 101 through the power meter and relay module 104. A noise filter 103*a* prevents noise transfer to the connected appliance from the ETH, and also prevents the transfer of noise from the appliance to the ETH. The status of the relay and the power monitoring information are collected by the power meter and relay module 104 and passed to the MCU 107, which transfers the information collected to the communication module 409 via a second port with a UART or MII on the communication module 409. This information is also converted by the communication module 409 into the broadband format used for PLC and transferred to the power distribution lines 101 through the coupler filter module 111.

The modules for broadband data communication and power monitoring and control all allow bi-directional flow of data, information, and control commands, enabling the establishment of a broadband PLC based LAN and also enabling remote monitoring and control of the plug. The control commands received over the PLC broadband network are converted to the right data stream format by the communication module 409 and sent to the MCU 107. The MCU 107 interprets these control commands and instructs the power meter and relay module 104 to enable, disable, or control the power to the plug 103 as per the instructions provided.

Figure 5:
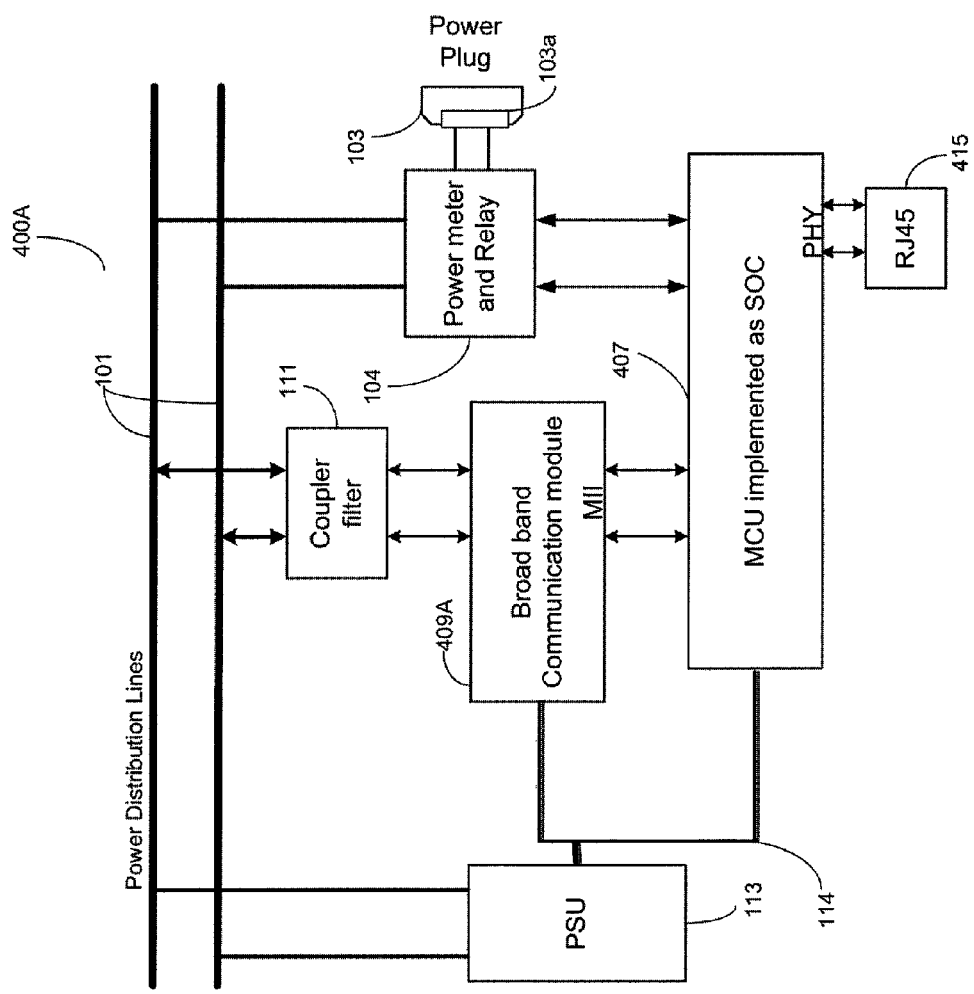
FIG. 5 is a block schematic diagram showing a data communication enabled power switch unit (ETH) having broadband for PLC and for monitor and control information transfer according to the invention.

FIG. 5 is a schematic block diagram of a third implementation of ETH unit 400A. This implementation operates in a manner similar to the previously described implementation in FIG. 4, a difference being that the MCU 407 is implemented as an system on chip (SOC) which integrates the communication PHY in the MCU 407. A special port on the MCU 407 is provided for direct connection of the RJ45 connector 415 to the PHY integrated in the MCU 407. The implementation uses a single MII port on the broadband communication module 409A to connect to the MCU 407 for communication and for transfer of information regarding power monitoring and control. The communication module 409A, as in the previous case, uses broadband PLC communication to communicate the data stream and information over the power distribution lines 101.

Master Unit (MST)

The MST is the third basic unit of the invention and provides the computing power and storage capability necessary to collect and compile power consumption information provided to it. The connected SW units and ETH units monitor the power usage of devices and appliances connected to their respective power plugs. This information is sent over the local power distribution lines in the home or office to the MST for compilation of data on usage. With the capability and computing power available the MST exerts local and emergency control of the appliances connected to the SWs and ETH units. The MST further acts as a gateway connecting to the broadband communication modem to enable a communication pathway to the Internet, thereby connecting to the wide area network [WAN].

Figure 6:
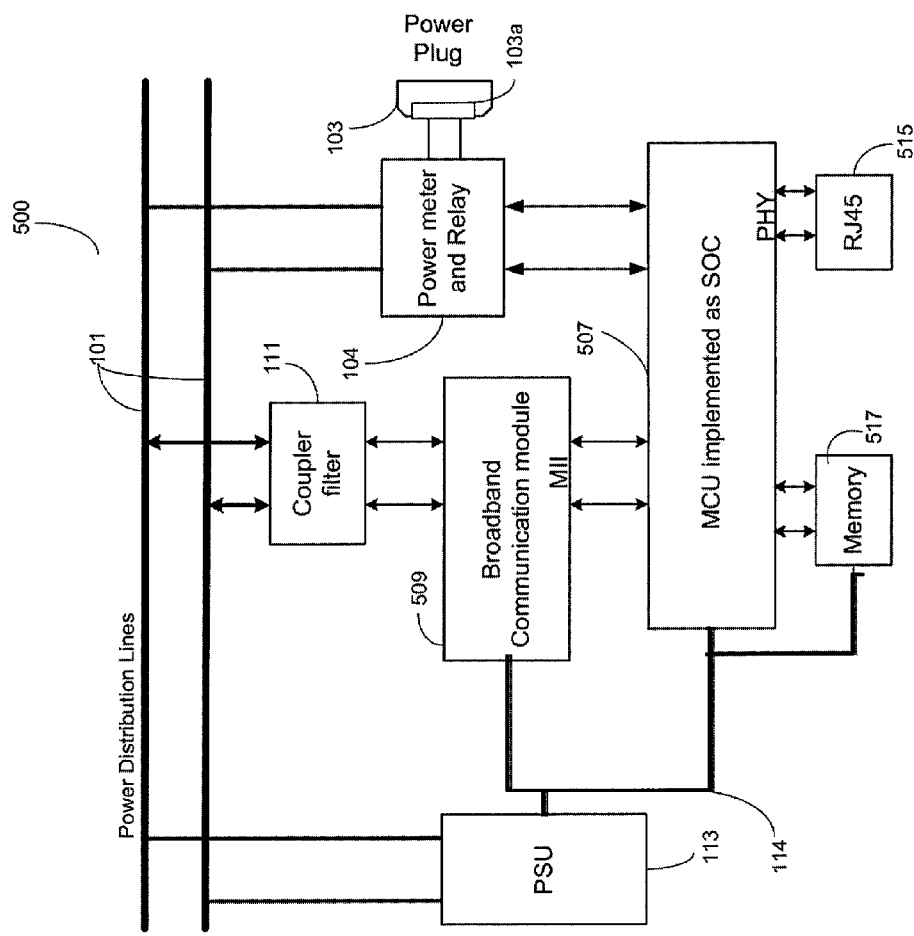
FIG. 6 is a block schematic diagram showing a master unit (MST) having a broadband connection for the Internet and PLC data, and for monitor and control information according to the invention.

FIG. 6 is a schematic block diagram of a first implementation of MST 500. In this implementation, an MCU having sufficient processing capability, typically a 16- or 32-bit MCU, is implemented as a system on chip (SOC) 507. This SOC 507 implementation provides for higher processing power and integration of modules with the MCU. The SOC 507 integrates the PHY into the MCU, thus allowing the RJ45 connector 515 for connecting the customer's modem device directly to a port on the SOC 507. This connection provides the gateway to the Internet for the PLC LAN for communication from the connected ETH units. The SOC 507 enforces all communication-related security protocols associated with the PLC LAN. Further, all data and power monitoring and control information is provided to the SOC 507 from the connected units via the power distribution lines 101 through the coupler filter module 111 and the communication module 509. The SOC 507 receives the information and processes it for outward transmission to the Web. The SOC 507 also has an associated memory 517, typically connected to a memory port. The memory 517 enables the SOC 507 to store the received power monitoring and control information prior to processing and compiling the information. The memory 517 also stores the compiled information to transmit it out through the gateway optimally when the bandwidth usage for communication is low. The memory 517 also stores transaction history and information on incoming commands. The memory 517 provides for tracking of performance and remote debugging capability for the ETH 500 unit among other uses.

The MST 500 provides a power plug 103, with a noise filter 103a, connected to the power distribution lines 101 through a power meter and relay 104. This power plug 103 supplies power to any needed appliance with the necessary power monitoring and control capability. This monitored information is sent to the MCU implemented as an SOC 507 to be combined with the information received over the PLC LAN over the power distribution lines 101 through the coupler filter module 111 and the communication module 509. This collected information is stored in the memory and compiled and processed for transmission to the monitoring sources in the WAN cloud through the modem connected to the SOC 507 at the RJ45 connector 515. The transfer of the compiled information is typically done in a store and forward manner with storage in the memory 517 to enable best use of the available bandwidth of the gateway.

Remote control commands from via the gateway are received through the RJ45 connector 515 from the connected modem. These control commands are interpreted by the SOC 507 of the MST 500 and sent to the respective SW 100 or ETH 400 units to which it is addressed over the broadband PLC LAN through communication module 509 and coupler filter module 111 for necessary action at the receiving units.

Figure 7:
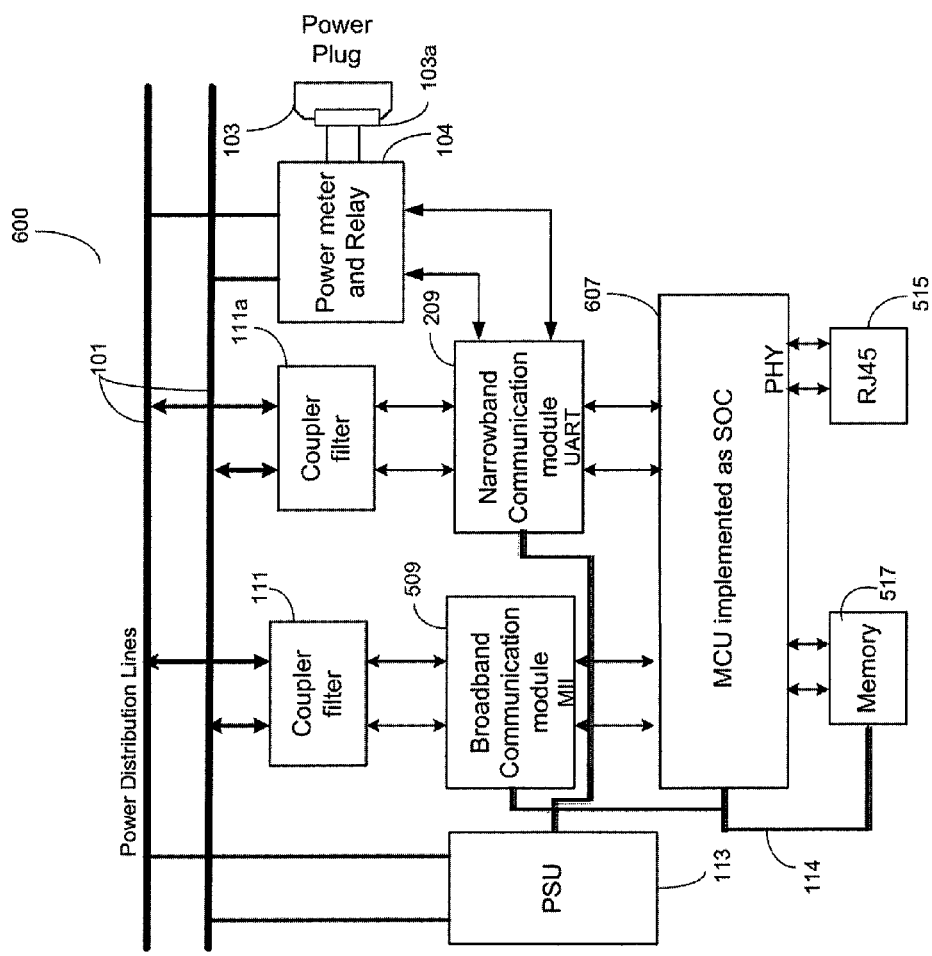
FIG. 7 is a block schematic diagram showing a master unit (MST) having a broadband connection for the Internet and PLC data, and a narrowband connection for monitor and control information according to the invention.

FIG. 7 is a block schematic diagram of a second implementation of the MST 600. This implementation also uses an MCU, preferably a 32-bit MCU, manufactured as a SOC 607. One difference between the previous implementation of the MST 500 and this implementation of the MST 600 is that the MST 600 uses narrowband transmission and reception of power monitoring and control information and broadband PLC for communication. This separation is at times advantageous, especially when the available broadband bandwidth is necessary for communication within the PLC LAN. Once the collected information is received by the SOC 607 it compiled, stored, and transmitted out to the modem via the RJ45 connector 515 on the SOC 607 as in the previous case of MST 500. Remote Control commands are received by the SOC 600 and transmitted back to the respective connected SW 200 and ETH 300 units with narrowband capability over narrowband communication channel. Data communication is handled using broadband PLC channel over the power distribution lines, as in the case of MST 500.

The MST 600 also has a power plug 103 with a noise filter 103a, connected through a power meter and relay 104. The power meter and relay 104 is used to monitor and control the power supply to any device connected to the plug 103. The monitored power usage information is fed to the MCU implemented in the SOC 607. Monitored power information from other SW and ETH units is sent over the power distribution lines 101 using the narrowband communication capability, to be received by the narrowband communication module 209. A coupler filter module 111a prevents power frequency and broadband communication frequency coupling to the narrowband communication module 209. The narrowband communication module 209 extracts the information from the communication stream and supplies it to the MCU in the SOC 607. The received information is combined with the local information and stored in the memory 517 prior to processing. This stored information is retrieved, compiled, and processed by the MCU based on predefined criteria and transmitted out to the appropriate site in the WAN cloud through RJ45 connector 515 and the broadband modem attached to it.

Any remote commands received via the gateway are received through the RJ45 connector 515 from the connected modem. These control commands are interpreted by the SOC 607 of the MST 600 and sent to the communication module 209 to be converted to the narrowband transmission format for sending over the power distribution lines 101. The commands are then sent through the coupler filter 209 to the power distribution lines 101 to be sent to the respective narrowband enabled SW 200 or ETH 300 units to which it is addressed for necessary action at the receiving units.

The MST 600 also acts as the gateway for communication, linking the PLC LAN system with the WAN cloud. The ETH units connected to customer communication devices send data streams over the power distribution lines 101 using a PLC specific broadband format. The communication module 111 of the MST 600 receives the data streams and extracts the data. This data is then sent to the MCU integrated into the SOC 607 where it is checked for permissions. The data is then sent to the modem connected to the RJ45 connector for transport over the Internet. Because all of the communication modules in this embodiment are bidirectional, the MST can receive data from the Internet through the connected modem and direct the data to the appropriate ETH units over the PLC LAN.

Typical Connection for the Units as a Complete System

Figure 8:
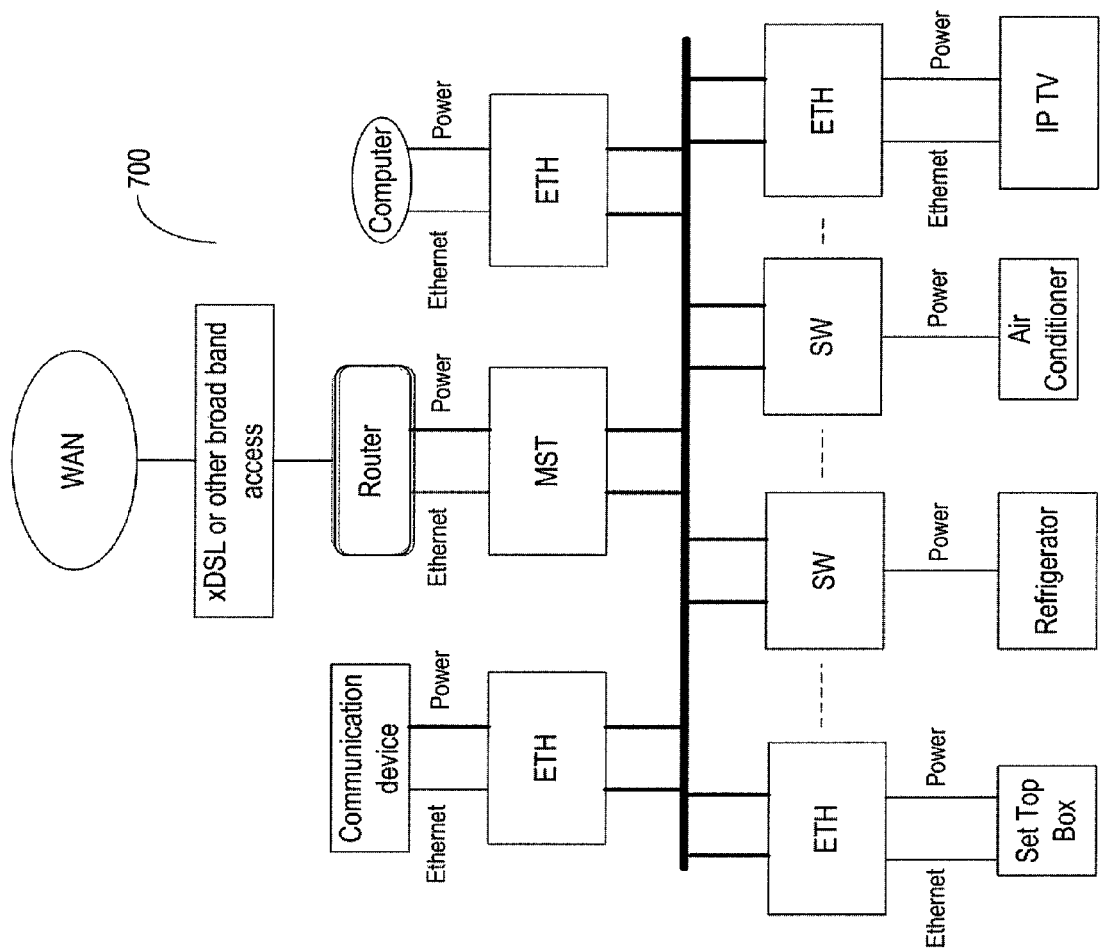
FIG. 8 is a block schematic diagram showing the connections that are established when using the SW, ETH, and MST in a home or office setting according to the invention.

FIG. 8 is a schematic block diagram showing powered management and communication connectivity 700 using the three units of the invention. The SW units are used where the requirement is for power connection capability with monitoring and control, but without the need to connect a communication device into the PLC LAN. The ETH devices also provide communication device connections to the PLC LAN, while providing a power plug or power source which can be monitored and controlled. Multiple SW and ETH units can be used to establish the power monitoring and control for the home and provide connectivity for data communication on the PLC LAN level.

The use of a single MST for the home provides the capability to establish a WAN gateway that enables the PLC LAN to communicate with the outside world using security and connection rules. The MST is also used as a collection and compilation point for the power monitoring function where the power usage within the home with connected SW and ETH units are received and compiled. Because there is connectivity with control capability on each SW and ETH unit, the power delivery through each of these SW and ETH units can be monitored and controlled from any of the communication devices connected to the PLC LAN. Further, this collected information on any of the power plugs can be accessed from the WAN cloud using connected communication devices to monitor the status and provide remote control commands through the WAN gateway. This capability is controlled by the permissions, authorizations, and security rules established for connection into the PLC LAN through the MST.

Because communication connections to the outside world through the MST gateway, and within the PLC LAN via the ETH, are all broadband enabled, the system can provide steaming media capability within the PLC LAN. It can access and enable streaming media delivery to display devices connected using ETH units through the WAN gateway. Hence, the system enables and supports applications such as IP TV and video conferencing that use video streaming.

The system is also enabled to facilitate macro level collection and compilation of power usage information. For this, the collected power monitoring and usage information is transmitted over the WAN gateway to one or more central power usage collection units. These units collect the data for analysis and provide input to the public bodies for making policy decisions on 'greenhouse gas' reduction requirements.

Although the invention is described herein with reference to the preferred embodiment, one skilled in the art will readily appreciate that other applications may be substituted for those set forth herein without departing from the spirit and scope of the present invention. For example, the units may be implemented as an assembly of individual components, as a combination of components and integrated circuits or as one or more SOCs. Accordingly, the invention should only be limited by the Claims included below.

The invention claimed is:

1. An apparatus for providing voice and data communication within a premises and monitoring and control of power usage of one or more appliances therein, comprising:
  a communication enabled power switch unit (ETH) connected to a power distribution line, said ETH is configured for monitoring, collection, and control of power usage of appliances connected through said ETH, via a power plug having a noise filter, to said power distribution line;
  said ETH comprising a first broad band communication module under control of a first CPU;
  said first broadband communication module coupled to the power line distribution via a first filter coupler that is a band pass filter enabled to pass broad band inputs between said first broad band communication module and the power distribution line;
  the apparatus further comprising:
  a master unit (MST) connected to said power distribution line, said MST in communication with said ETH via said power distribution line and configured for collection and compilation of power usage information from said ETH;
  said MST comprising a second broadband communication module under control of a second CPU;
  said second broadband communication module coupled to the power line distribution via a second filter coupler that is a band pass filter enabled to pass broad band inputs between the second broadband communication module and the power distribution line;
  said MST further configured as a communication gateway to a wide area network (WAN) for a local area network (LAN);
  wherein said MST and said ETH are configured for voice, data communication, and streaming media delivery using broad band transfer over said power distribution line, using the broad band communication modules that are coupled to the power distribution line by the first filter coupler and the second filter coupler that act as pass filters for the broadband frequency;
  wherein said MST is further configured for a narrowband transfer of collected power usage and control information over said power distribution line, using a communication module coupled to said power distribution line using a third filter coupler that is a bandpass filter for the narrow band frequency used for said transfer of said collected power usage and control information;
  wherein a particular ETH monitors power usage for a particular individual appliance of the one or more appliances and sends corresponding power usage information to said MST;
  wherein said collected and compiled power usage information is applied either by said ETH when controlling said particular individual appliance from within said LAN or remotely from said WAN through said communication gateway via said MST.

2. The apparatus of claim 1, further comprising:
  at least one power switch unit (SW) configured for monitoring and controlling power usage of one or more of said appliances within said premises.

3. The apparatus of claim 2, further comprising:
  at least one MST configured for collecting and compiling said collected and compiled power usage information for transmission to at least one remote site in said WAN, and configured as a gateway to provide a connection for communication.

4. The method of claim 1, wherein a first appliance of the one or more appliances sends media to a second appliance of the one or more appliances using the broad band transfer over said power distribution line.

5. An apparatus for communication over a power line distribution, comprising:
  a plurality of sensors configured for collecting power usage information for corresponding appliances, each of said appliances receiving operating power from said power distribution line;
  said sensors configured for effecting power management and control and for providing local area networking;
  said sensors comprising at least an intelligent master sensor and one or more slave devices;
  said one or more slave devices comprising at least one communication and power management sensor;
  said master sensor configured for collecting and compiling power usage data provided by said slave sensors with regard to said slave sensors' corresponding appliances, and configured for communicating said data to a wide area communication network;
  wherein a particular power management sensor monitors power usage for a particular individual appliance of the corresponding appliances and sends corresponding power usage information to said master sensor;
  wherein said master sensor is configured for both narrowband and broadband transfer of collected power usage and control information over said power distribution line, using a communication module coupled to said power distribution line using a coupler filter module that is a high pass filter for allowing broad band frequencies to pass through the high pass filter and blocking frequencies below the broad band range from passing through the high pass filter or a band pass filter for allowing only narrow band frequencies to pass through the band pass filter;

wherein said master sensor is configured for a broadband reception and transfer;

said master sensor configured for receiving and distributing instructions for controlling power usage of said appliances via switches associated with corresponding slave sensors;

wherein said at least one communication and power management sensor is configured to provide integrated sensing and control of appliance power usage and power management and to establish a local area network over said power distribution line having communication capability and that supports streaming media delivery;

wherein the particular individual appliances connects through said at least one communication and power management sensor to said power distribution line via a power plug having a noise filter.

6. A method for monitoring and control of power usage of one or more appliances, comprising the steps of:

providing at least one of:

a power switch unit (SW) connected to a power distribution line for monitoring and controlling power usage of at least one appliance connected to said SW; and a communication enabled power switch unit (ETH) connected to said power distribution line, said ETH configured to provide power line communication (PLC) and thereby form a local area network (LAN) over said power distribution line;

wherein said ETH is configured for monitoring, collection, and control of power usage of appliances connected through said ETH, via a power plug having a noise filter, to said power distribution line;

wherein said ETH comprises a first broad band communication module under control of a first CPU;

said first broadband communication module coupled to the power distribution line via a first filter coupler that is a band pass filter enabled to pass broad band inputs between said first broad band communication module and the power distribution line;

providing a master unit (MST) connected to said power distribution line, said MST in communication with said ETH, via said power distribution line and configured for collection and compilation of power usage information from ETH;

wherein said ETH monitors power usage for a particular individual appliance and sends corresponding power usage information to said MST;

said MST comprising a second broadband communication module under control of a second CPU;

said second broadband communication module coupled to the power line distribution via a second filter coupler that is a band pass filter enabled to pass broad band inputs between the second broadband communication module and the power distribution line;

wherein said MST and ETH are further configured for of a narrowband transfer of collected power usage and control information over said power distribution line, said ETH using a first narrow band communication module coupled to said power distribution line using a third filter coupler that is a bandpass filter for the narrow band frequency used, and said MST using a second narrow band communication module coupled to said power distribution line using a fourth filter coupler that is a bandpass filter for the narrow band frequency used, for said transfer of said collected power usage and control information;

wherein said MST and said ETH are configured for broadband transfer of voice and data communication and streaming media delivery within said LAN;

said MST configured as a communication gateway to a wide area network (WAN) for said LAN;

wherein said collected and compiled power usage information is applied either by said ETH when controlling said particular individual appliance from within said LAN or remotely from said WAN through said communication gateway via said MST.

* * * * *